E. Fitzgerald,

Bread Machine,

No. 1,524, Reissued Aug. 18, 1863.

N. PETERS, PHOTO-LITHOGRAPHER, WASHINGTON, D. C.

UNITED STATES PATENT OFFICE.

ELISHA FITZGERALD, OF NEW YORK, N. Y.

IMPROVEMENT IN AERATING PASTE OR DOUGH.

Specification forming part of Letters Patent No. 33,432 dated October 8, 1861; Reissue No. 1,524, dated August 18, 1863.

*To all whom it may concern:*

Be it known that I, ELISHA FITSGERALD, of the city, county, and State of New York, have invented a certain new and useful Process of Aerating Paste or Dough; and I do hereby declare that the following is a clear and exact description of the same, reference being had to the accompanying drawings, making a part of this specification, in which—

Figure 1:
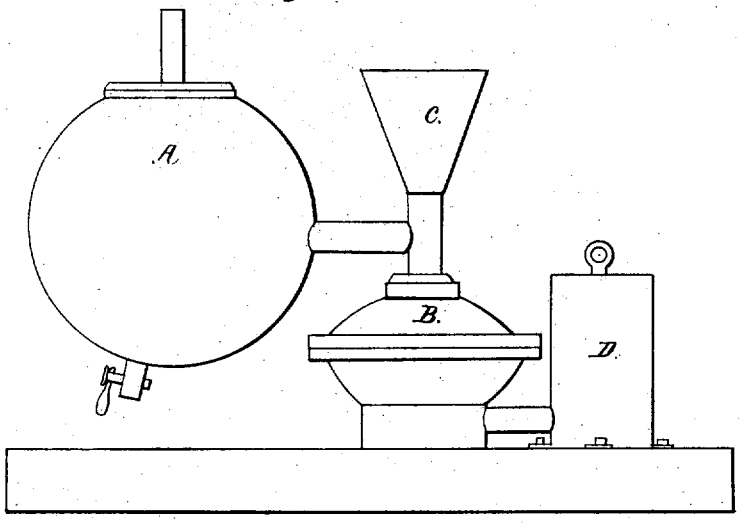
Figure 2:
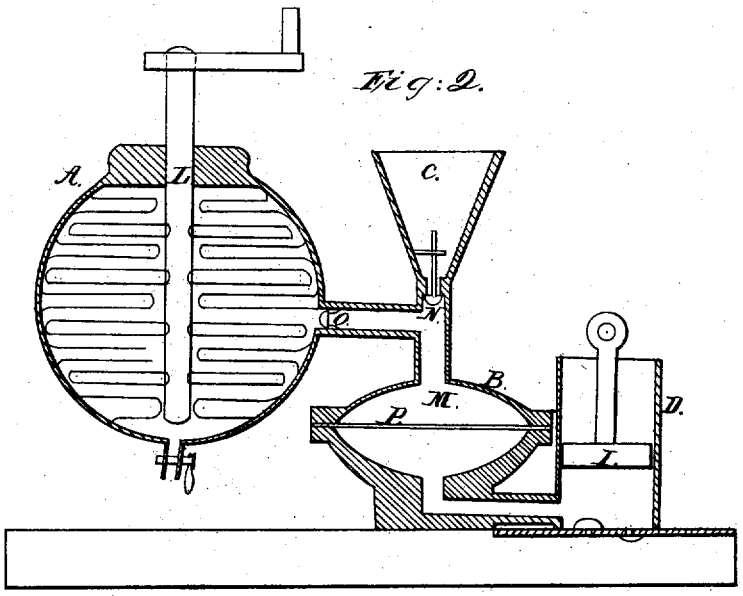

Figure 1 shows a side elevation. Fig. 2 is a section through the apparatus, showing the interior arrangement of the receiver, a pump, and the connecting parts.

My invention consists in a process by which a constant supply of dough or paste and gas is kept up in a receiver under necessary pressure to produce aerated bread, thereby obviating the evils arising from the admission of atmospheric air into the receiver, which deteriorates the quality of the dough.

To enable others skilled in the art to use successfully my improved process with a suitable apparatus for the purpose, I will describe the operation more fully, referring to the drawings and to the letters of reference marked thereon.

I make the receiver A of metal, in a spherical or elliptical form, of sufficient capacity to hold from one to two barrels of flour, which have been previously mixed with the proper quantity of salt and water. On the inside of the receiver A are projecting blades, secured in a horizontal position, at such distances apart as to allow similar blades, which are attached to a central shaft, L, to rotate between the stationary blades for the purpose of distributing and thoroughly impregnating tne mass with gas. The hopper C is made funnel or cone shaped, to receive the dough or paste which is forced through the aperture when the valve N is drawn, by forming a vacuum or the suction by the operation of the pump D. By the action of the piston I in the cylinder or pump D, or any equivalent device, the paste or dough is forced through the horizontal tube and valve *o* into the receiver against the pressure inside, thereby keeping up a continuous supply of the material, which entirely avoids the necessity of letting off the pressure ot the gas and opening the receiver to replenish it after the contents have been drawn off at the spigot or orifice at the bottom of the receiver for baking.

In the process heretofore known and used for making unfermented aerated bread, the contents of the receiver having been drawn out at the orifice, it must again be replenished. This is done by having a large orifice at or near the top of the receiver, which is closed by a cap or lid screwed down so as to be airtight. After the gas is drawn off into the gasometer the lid or cap is removed, the flour, salt, and water put in, the orifice closed, the air pumped out, and the gas forced in before any of the aerated dough can be drawn out. This manipulation takes place many times in a day, takes up time, and is attended with much difficulty, and, moreover, the effect upon the contents of the receiver is not uniform, so that bread baked from the first drawn out will be of different quality from the last drawn; and, furthermore, the greatest difficulty that is experienced by the old process is the admission of the atmospheric air into the receiver every time it is replenished for a new batch, which is many times a day. When the air is mixed in any considerable quantity with the gas the effect upon the dough is to deteriorate the mass by giving to the bread an unpleasant oder and taste. By my improved continuous process of aerating dough for bread, I mix the ingredients outside of the receiver, and, by keeping the hopper supplied with the paste or dough, the action of the pump, aided by the atmospheric pressure above, will force the dough into the conducting-tube, and by the return-stroke of the piston the paste or dough is forced through the orifice closed by the valve *o* into the receiver against the pressure of the gas within, which is then, during the mixing, incorporated with the paste and fully aerated or carbonated. Thus it will be seen that a continuous supply of dough and gas can be kept up in the receiver, free from the atmospheric air, for an indefinite period during the time of drawing out.

Having thus described my improved process for aerating paste or dough for bread, what I claim as new, and desire to secure by Letters Patent, is—

1. Forcing the dough or paste into the receiver A against the pressure of the gas.

2. The process of keeping up a continuous supply of dough or paste under pressure in the receiver.

ELISHA FITZGERALD.

Witnesses:
EDM. F. BROWN,
J. B. WOODRUFF.